O. M. OTTE.
SPOT LIGHT MOUNTING.
APPLICATION FILED OCT. 18, 1917.
1,272,842.
Patented July 16, 1918.
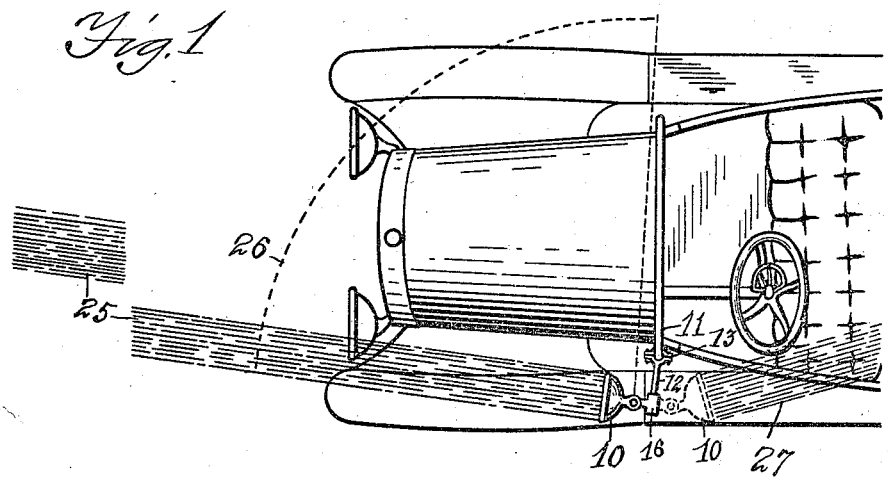
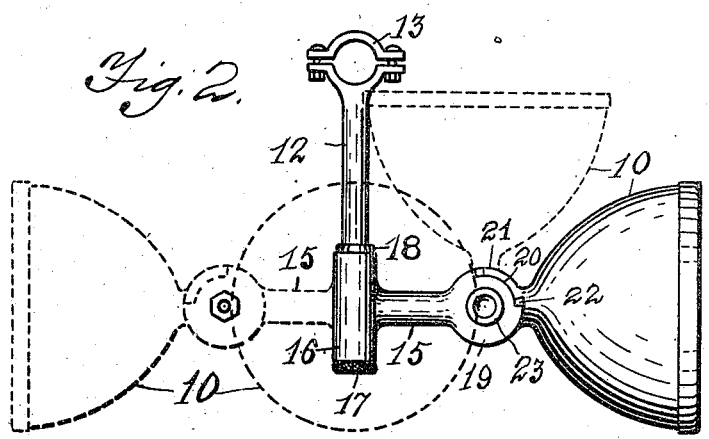
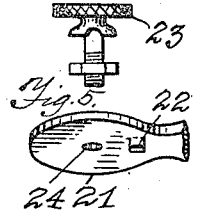
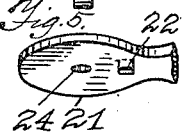
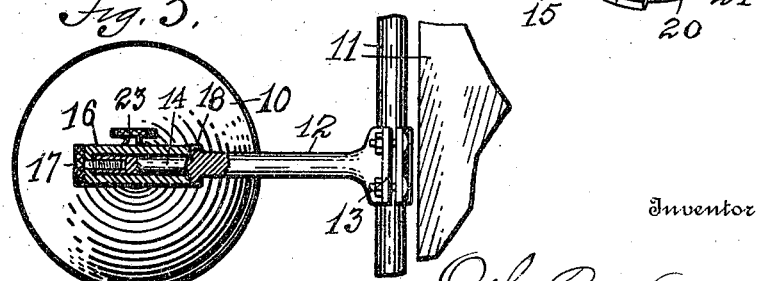

UNITED STATES PATENT OFFICE.

OTHO M. OTTE, OF JAMESTOWN, NEW YORK.

SPOT-LIGHT MOUNTING.

1,272,842.     Specification of Letters Patent.    Patented July 16, 1918.

Application filed October 18, 1917. Serial No. 197,353.

*To all whom it may concern:*

Be it known that I, OTHO M. OTTE, a citizen of the United States, residing at the city of Jamestown, in the county of Chautauqua and State of New York, have invented certain new and useful Improvements in Spot-Light Mountings, of which the following, taken in connection with the accompanying drawings, is a specification.

The invention relates to mountings for spot lights; and the object of my improvement is to provide a simple and strong mounting for a spot light which permits its turning pivotally only at certain angles and so that it cannot be turned into the eyes of the driver of an approaching vehicle, provision also being made for a quarter turn toward the vehicle upon which it is mounted and away from the passing vehicle; and the invention consists in the construction and arrangement of the device as shown and described in this specification and the accompanying drawings and pointed out in the claims.

In the drawings, Figure 1 is a plan view of the front portion of an automobile with the spot light arm or mounting attached to the frame of the wind shield and showing in dotted outline the spot light turned to the rearward position. Fig. 2 is a plan view of the spot light and mounting removed from the wind shield and showing in dotted line different positions to which it may be turned. Fig. 3 is a plan view of the rear side of the spot light showing the pivotal mounting in section to reveal the construction thereof and showing the manner of attachment to the wind shield front. Fig. 4 is an elevation of the adjusting screw for the spot light; and Figs. 5 and 6 show the flat disk shaped end of the rear end of the spot light and of the similar shaped end of the arm for supporting said light whereby a quarter turn adjustment of the spot light may be made by means of a quarter arc cut in one of said disks and a projection on the other disk engaging in said cut.

Like characters of reference refer to corresponding parts in the several views.

The numeral 10 designates the spot light which is mounted upon the wind shield frame 11 by means of the arm 12 and clamp 13.

A second arm 15 is rotatably mounted on the outer end 14 of the arm 12. The arm 15 is provided with a sleeve 16 which fits over the end 14 and a screw 17 is provided to hold the sleeve 16 upon said end 14, a shoulder 18 being provided on the arm 12 to limit the inward movement of the end 14 within the sleeve 16.

The arm 15 extends out in a flat disk shaped end portion 19 which has a quarter turn arc shaped cut 20 therein. The rear end of the casing 10 of the spot light has a similar shaped flat disk 21 which fits against the disk 19 and has a sidewise projection 22 extending out therefrom which engages within the arc shaped cut out 20 thereby limiting the movement of the disk 19 upon the disk 21. A hole 24 is provided through the centers of the two flat disks 19 and 21 and a screw bolt 23 is provided to fit therein and pivotally attach said disk 21 to the disk 19 through the hole 24 so that it may be pivotally moved the one-fourth rotation permitted by the cut 20.

The clamp 13 is placed at such an angle to the arm 12 that when attached to the upright of the wind shield 11, as shown in Figs. 1 and 3, it holds the arm 12 at a slight forward inclination so that the spot light 10 throws a light shaft 25 which strikes the center of the roadway about fifty to one hundred feet in front of the vehicle, as diagrammed in dotted outline in Fig. 1, said light shaft being broken in front of the automobile to bring the drawing within the required confines of the sheet.

The arc shaped opening 20 is placed on the side of the disk 19 toward the car so that the spot light 10 may be turned toward or across the car as shown at 26 in dotted line in Fig. 1.

It is apparent that the arm 12 and clamp 13 will hold the spot light 10 firmly in the required position, and that said spot light may be turned on the arm 15 and fastened in the required position by means of the screw 17 in the outer end thereof which binds the sleeve 16 against the shoulder 18. The screw 17 is knurled on its periphery so that it may be manually turned thereby loosening the sleeve 16 and permitting its rotation to the rearward position as shown in dotted outline in Fig. 1, to thereby throw a shaft 27 into the car, the quarter turn 20—22 permitting the turning of the spot light to any portion of the interior of the car. The screw bolt 23 is also knurled so that it may be manually turned to adjust the spot light 10 at any required position.

It is now apparent that the spot light can be turned into all positions necessary for use about the car yet it can not be turned into the eyes of the driver of an approaching vehicle unless said driver is squarely in front of the car at such close proximity thereto as to be in danger of collision and therefore in a position which would not be permitted, and even in that position the light shaft would normally be directed at a downward angle upon the roadway and therefore out of range.

I claim as new:—

1. A mounting for a spot light comprising a supporting arm having a clamp for an upright standard on one end and a journal on the other end, a second arm having a sleeved end fitting on said journal end of said supporting arm and a flattened disk on the other end, said flattened disk having a hole therethrough and spaced stops on its outer edge, a set screw to adjustably attach said sleeve to said journal, a spot light having a disk shaped end with a hole therethrough for attachment to the disk shaped end of said second arm, a bolt to adjustably clamp said disks, and a projection on said disk shaped end of said spot light to engage between said spaced stops on the disk shaped end of said second arm to limit the rotative movement of said spot light.

2. In combination with a light and a casing therefor, a horizontal arm having means at one end for attachment to a support, a second arm at right angles to the first arm having a transversely extending sleeve on one end and a disk on its other end, said sleeve being received over the opposite end of the horizontal arm, a disk on the rear end of the light casing having a projection, means to turnably connect the disks, shoulders on the first named disk to engage said projection so as to limit turning movement of the light casing and means to rigidly hold the sleeve on the horizontal arm.

3. In combination with a light and a casing therefor, a horizontal arm having means at one end for attachment to a support, a second arm at right angles to the first arm having a transversely extending sleeve on one end and a disk on its other end, said sleeve being received over the opposite end of the horizontal arm to allow the second arm to swing on opposite sides of the first arm, means to rigidly hold the sleeve on said first named arm, a disk on the rear end of the light casing superimposed on the first named disk, means to turnably connect the disks, and means between the disks for limiting the movements of the light casing so as to allow the latter to swing to right angular positions on either side of the first arm.

4. In combination with a light and a casing therefor, a horizontal arm having means at one end for attachment to a support, a second arm at right angles to the first arm, means to turnably connect the inner end of the second arm to the first arm so as to allow the second arm to swing throughout the circumference of the first arm, a disk on the rear end of the light casing arranged in the plane of the longitudinal axis of the latter and a disk on the outer end of the second arm pivotally connected to the first disk so that the longitudinal axis of the light casing in one position thereof forms a continuation of the longitudinal axis of the second arm and is in the same plane as said longitudinal axis of the second arm.

In testimony whereof I have affixed my signature in the presence of two witnesses.

OTHO M. OTTE.

Witnesses:
H. A. SANDBERG,
I. E. NORDSTROM.